Figure 1:
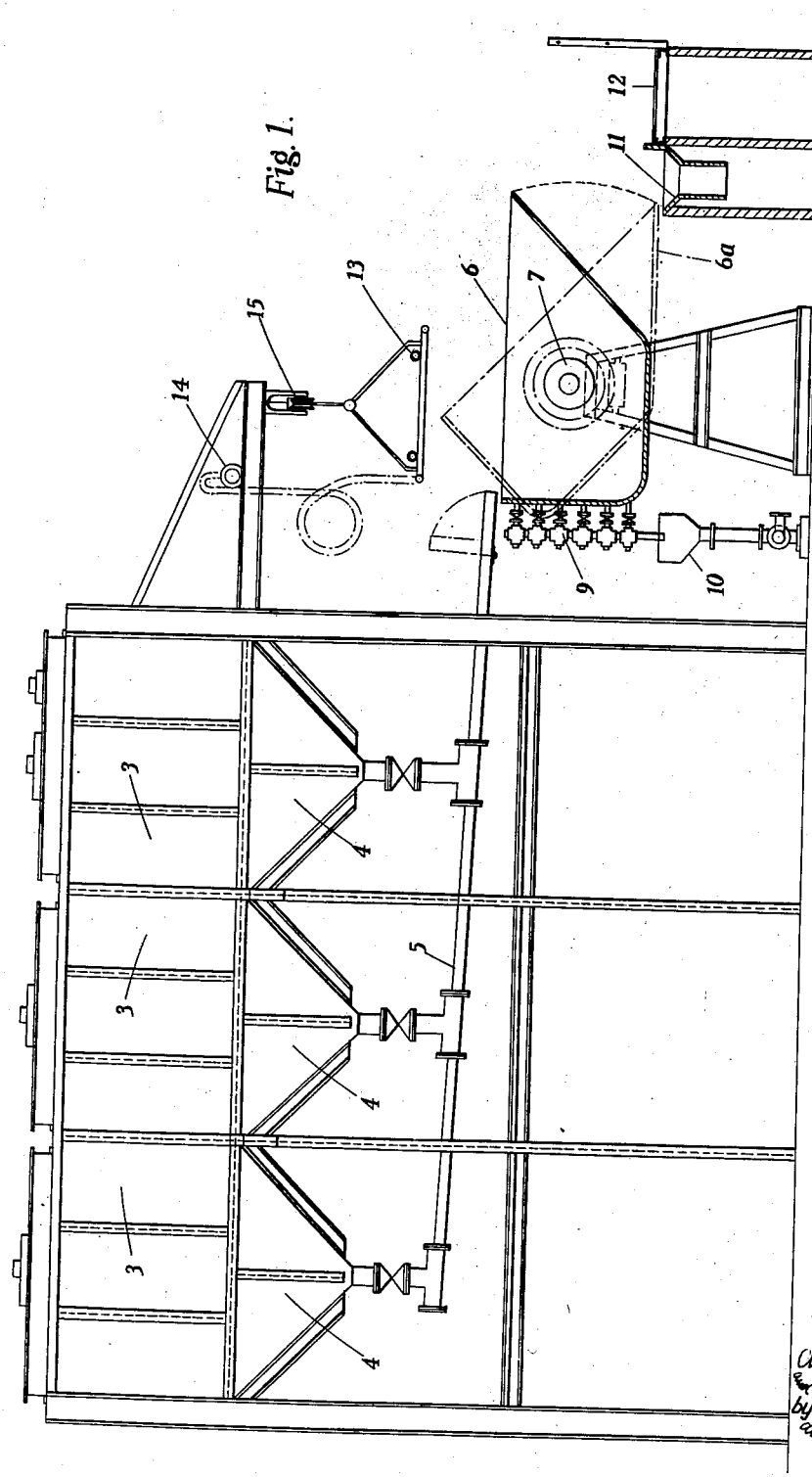

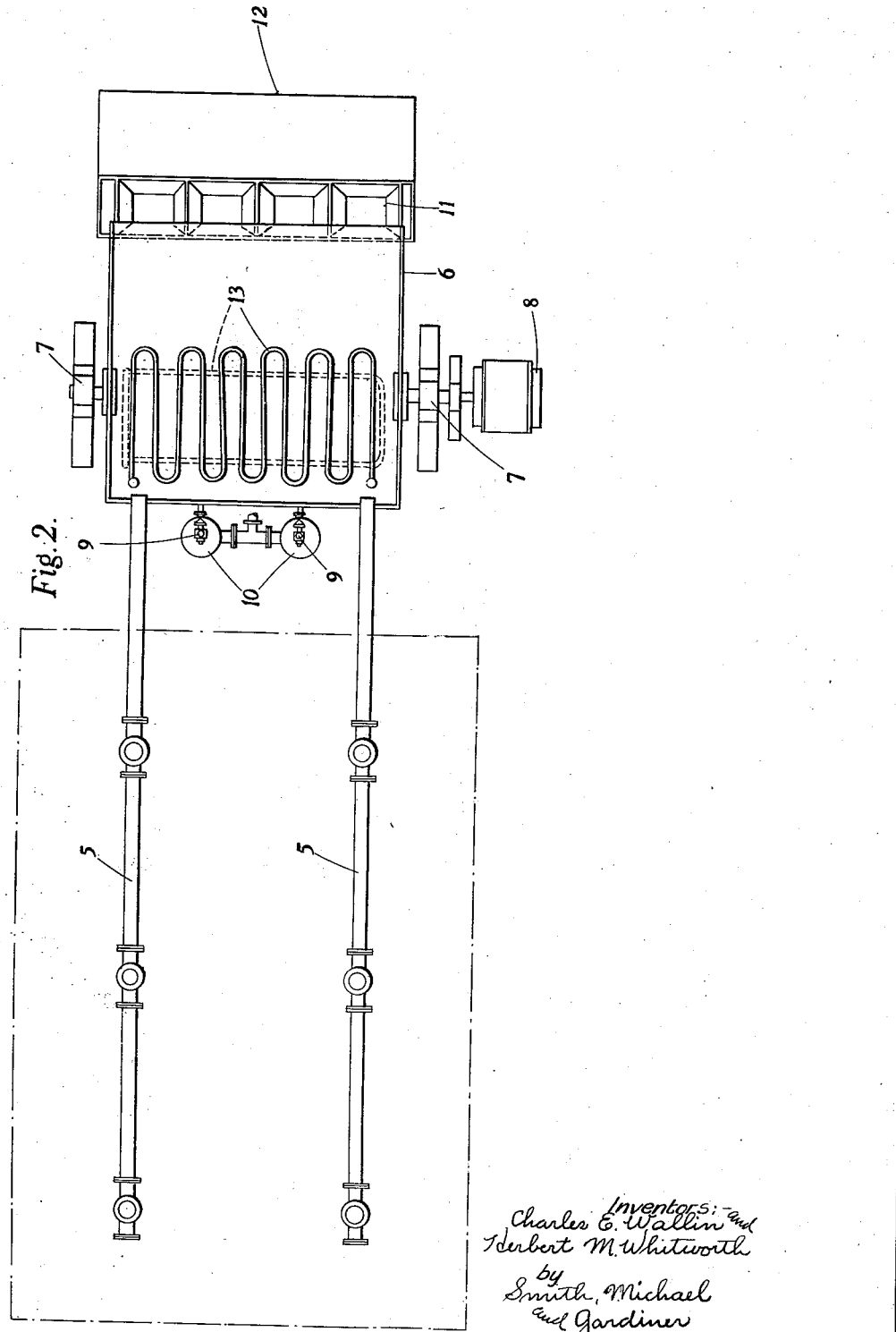

Patented Apr. 1, 1941

2,237,204

UNITED STATES PATENT OFFICE 2,237,204

ANCILLARY EQUIPMENT OF COKING PLANTS

Charles Ethelbert Wallin and Herbert Milton Whitworth, Guildford, England, assignors to Woodall-Duckham (1920) Limited, Guildford, Surrey, England, a British company Application February 21, 1940, Serial No. 320,202
In Great Britain March 9, 1939

3 Claims. (Cl. 210—51)

This invention relates to improvements in the ancillary equipment of coal carbonising plants, such as coke-oven plants.

In coke-oven plants it is the custom to spray hot gas leaving the ovens with ammonical liquor. This causes the precipitation of a proportion of tar and liquor, which is drained from the gas-collecting main into a separating tank (often called a "flushing tank," and referred to in the present specification by this name). The tar and liquor separate in the flushing tank, the tar falling to the bottom, while the liquor is recirculated to the sprays in the gas-offtakes. The tar and liquor entering the flushing tank have entrained therein a certain amount of fine coal and heavy sludge (hereinafter referred to as "sludge"), which collects in the bottom of the flushing tank, and must periodically be removed therefrom. This sludge has a proportion of useful tar mixed therewith, which it is desirable both to recover for its own value before the sludge is disposed of, and to remove in order to facilitate disposal of the sludge.

The objects of the present invention are therefore to provide a convenient and clean method of, and apparatus for dealing with the tarry sludge in order to dispose of the same and to separate the entrained tar from the sludge.

According to the present invention, tar is separated from the tarry sludge collecting in the flushing tank of a coal carbonising plant and the sludge is disposed of, by the following sequence of steps:—the tarry sludge from the flushing tank is drained into a separating tank rotatable about a horizontal axis, the contents of the separating tank are subjected to heat to cause a separation of the tar, the separated tar is drained off, and the separating tank is then tilted on its axis, to facilitate the removal of the residual sludge therefrom.

The invention further consists in apparatus for carrying out the sequence of steps referred to in the preceding paragraph, the apparatus comprising a separating tank having one side sloping, and mounted for tilting about a horizontal axis, into which separating tank the sludge from the flushing tank can be drained, with a tar manifold having outlets from the separating tank at spaced levels, and with means to heat the contents of the separating tank, the sloping side of the separating tank forming, when the tank is tilted, a substantially horizontal platform over which residual sludge is scraped or discharged into receptacles therefor.

A suitable apparatus for carrying out the present invention is described with reference to the accompanying drawings, in which, Figure 1 shows diagrammatically a side elevation of the apparatus, and Figure 2 shows diagrammatically a plan view.

The tar and liquor flushing tank 3 is of known form having a plurality of conical depressions 4 in the base thereof, from which valve-controlled outlets lead to conduits 5. The separating tank 6 is mounted on trunnions 7 and can be rotated between the horizontal and tilted positions by the reversible motor 8. One side of the separating tank 6 is made sloping as shown in Figure 1. On the opposite side of the separating tank is a tar run-off manifold 9 having a plurality of outlets at spaced levels. The tar drained off from the tank is run from the manifold 9 into a tar drain 10.

As shown in Figure 1, the sloping side of the separating tank, when the tank is in the tilted position 6a, forms a horizontal platform co-acting with the sludge outlets 11, adjacent to which latter is a walk-way 12.

Above the separating tank 6 is a steam heating coil 13 which is arranged for either direct or indirect heating, or both, and is connected to a steam supply 14. The steam heating coil 13 can be lowered into the separating tank and raised therefrom by a suitable lifting device 15.

In operation, the tarry sludge collects in, or is scraped into the conical portions 4 of the flushing tank, and at intervals is drained off, with a certain amount of tar, through the conduits 5 into the separating tank 6. The contents of the tank 6 are then heated by the heating coil 13, which causes a separation of the tar. The tar rises to the top of the separating tank, while the sludge settles in the bottom of the tank. The steam coil 13 is withdrawn from the tank and the tar is then drained off to a suitable level through the tar manifold 9 into the tar drain 10. The separating tank is then tilted on its trunnions to the position 6a so that the inclined side forms a substantially horizontal platform over which the sludge is drained or scraped out by operators on the walk-way 12 into the sludge outlets 11, through which it falls into skips, and is removed for tipping or burning.

We claim:

1. The separation of tar from the tarry sludge collecting in the flushing tank of a coal carbonising plant and the disposal of the sludge, by the following sequence of steps:—draining the tarry sludge from the flushing tank into a separating tank rotatable about a horizontal axis; subjecting the contents of the separating tank to heat to cause a separation of the tar; draining off the separated tar; tilting the separating tank on its axis to facilitate the removal of the residual sludge therefrom; and emptying the separating tank of residual sludge over the side thereof.

2. Apparatus for effecting the separation of tar from the tarry sludge collecting in the flushing tank of a coal carbonising plant and for the disposal of the sludge, comprising in combination a separating tank having one side sloping and mounted for tilting about a horizontal axis, into which separating tank the sludge from the flushing tank can be drained, a tar manifold with outlets from the separating tank at spaced levels, and means to heat the contents of the separating tank, the sloping side of the separating tank forming, when the tank is tilted, a substantially horizontal platform over which residual sludge is scraped out or discharged.

3. Apparatus for effecting the separation of tar from the tarry sludge collecting in the flushing tank of a coal carbonising plant and for the disposal of the residual sludge, comprising in combination a separating tank mounted for tilting about a horizontal axis and having one side sloping, a conduit for draining tarry sludge from the flushing tank into the separating tank, a tar manifold on the separating tank with outlets at spaced vertical levels, a heating coil which can be inserted in and withdrawn from the separating tank, and a discharge bay for the residual sludge adjacent said separating tank and co-acting with the sloping side thereof, which sloping side in the tilted position of the separating tank, forms a substantially horizontal platform over which residual sludge is discharged from the separating tank.

CHARLES ETHELBERT WALLIN.
HERBERT MILTON WHITWORTH.